United States Patent [19]

Lopez et al.

[11] 4,402,920
[45] Sep. 6, 1983

[54] HUMIC FLOTATION OF WET PROCESS PHOSPHORIC ACID AS A PRETREATMENT STEP IN THE RECOVERY OF URANIUM

[75] Inventors: Jose G. Lopez; Victor J. Barnhart, both of Lakeland, Fla.

[73] Assignee: Wyoming Mineral Corporation, Lakewood, Colo.

[21] Appl. No.: 248,125

[22] Filed: Mar. 27, 1981

[51] Int. Cl.$^3$ .................... B01D 11/00; C01G 56/00; C01G 57/00; C01B 25/16
[52] U.S. Cl. ......................................... 423/8; 423/10; 423/321 R
[58] Field of Search .................. 423/6, 8, 9, 10, 321 R

[56] References Cited

U.S. PATENT DOCUMENTS

| | | | |
|---|---|---|---|
| 3,410,667 | 11/1968 | Sherief et al. | 423/6 |
| 3,711,591 | 1/1973 | Hurst et al. | 423/10 |
| 3,835,214 | 9/1974 | Hurst et al. | 423/10 |
| 4,087,512 | 5/1978 | Reese et al. | 423/321 R |
| 4,207,302 | 6/1980 | Smith | 423/321 R |
| 4,263,148 | 4/1981 | Symens et al. | 423/321 R |
| 4,278,640 | 7/1981 | Allen et al. | 423/321 R |

OTHER PUBLICATIONS

Flotation Fundamentals, 1970.

*Primary Examiner*—O. R. Vertiz
*Assistant Examiner*—Gregory A. Heller
*Attorney, Agent, or Firm*—D. P. Cillo

[57] ABSTRACT

An acidic solution containing metal values and also containing humic acid impurities, is purified by: (1) forming a gas in the acid solution, (2) adding high molecular weight anionic organic flocculant in a volume ratio of gas containing acid solution: flocculant of 1,000:0.002 to 0.10, to form a bottom, purified, aqueous acidic phase containing metal values and a top flocculated humic acid impurities froth phase and (3) removing the humic acid froth phase.

8 Claims, 2 Drawing Figures

HUMIC FLOTATION OF WET PROCESS PHOSPHORIC ACID AS A PRETREATMENT STEP IN THE RECOVERY OF URANIUM

BACKGROUND OF THE INVENTION

Commercially available wet process phosphoric acids are generally manufactured from either calcined rock or uncalcined rock. Calcining decomposes and drives off the organic matter in the rock, and the phosphoric acid product made by dissolving it, known as green acid, contains almost no suspended organic solids. When uncalcined rock is digested, considerable amounts of organic compounds are dissolved from the phosphate rock and remain as both soluble and insoluble impurities in the product acid, known as "black" or "brown" acid. The organic compounds in the acid are commonly referred to as humic acids. Uranium and other metals can be recovered from this commerical grade wet process phosphoric acid. Such recovery processes, directed primarily to uranium, are taught by Hurst and Crouse, in U.S. Pat. Nos. 3,711,591 and 3,835,214, relating to reductive stripping and oxidative stripping respectively.

The main purpose in mining phosphate rock has been to produce fertilizer. As an initial step in making fertilizer, the concentrated and milled phosphate rock is reacted with sulfuric acid under constant and intensive agitation, to produce a phosphoric acid solution and insoluble calcium sulfate (gypsum). A simple form of the reaction is expressed as follows:

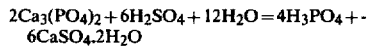

$$2Ca_3(PO_4)_2 + 6H_2SO_4 + 12H_2O = 4H_3PO_4 + 6CaSO_4 \cdot 2H_2O$$

The wet process phosphoric acid solution, formed as shown above, generally contains about 600 grams/liter of $H_3PO_4$, about 0.1 to 0.2 gram/liter of uranium, and substantial amounts of organic humic acid impurities. This metal containing acidic solution can be processed to remove the valuable uranium. For example, the solution of phosphoric acid can serve as the aqueous feed in a liquid-liquid solvent extraction process of uranium recovery.

To make the metal recovery process viable, however, it is necessary that the acidic solution be highly purified, in order to control sludge emulsion formation in the solvent extraction mixer-settlers used in the metal recovery process. This sludge problem, caused by the humic acid impurities, was recognized by Hurst and Crouse in U.S. Pat. No. 3,711,591.

Reese et al., in U.S. Pat. No. 4,087,512, attempted to solve problems of uranium extraction emulsions and sludge formation, caused by organic humic acids in the wet process phosphoric acid feed, by a pretreatment with a hydrocarbon at from 55° C. to 70° C. The volume ratio of acid:hydrocarbon was as high as 30:1 and was preferably 2:1. The useful hydrocarbons used by Reese et al. including kerosene, gasoline, benzene and toluene. After the acid and the hydrocarbon are mixed, they are transferred to a separator with a conical bottom. After 5 to 10 minutes, the mixture separates into hydrocarbon phase, composed of hydrocarbon, emulsified solid organic materials and some captured phosphoric acid, and a purified heavier bottom aqueous phase, composed of phosphoric acid. The bottom aqueous phase is drawn from the conical bottom of the separator. The entire top hydrocarbon phase overflows the top of the separator into a settling chamber for further separation. Such a process, involving interaction of wet process phosphoric acid solely with a kerosene type hydrocarbon has not been found effective in removing a major portion of the organic humic acid over an extensive time period.

Simpler mechanical removal methods, such as pumping at the interface, after allowing sludge emulsions to form, are not particularly effective, because large quantities of expensive solvent are also pumped out. This pumping method is also hampered by the non-Newtonian flow properties of the sludge emulsion, which cause it to deviate from a normal pipe entrance behavior.

Various flotation processes have been used to concentrate valuable mineral particles, such as copper, molybdenum, cobalt and nickel particles from sulfide, phosphate, fluorite, and chromite ores in the mining industry, as described in *Flotation Fundaments*, Dow Chemical Co., Sections 1-3, 1970. Generally, ore feed is finely ground to release the valuable mineral particles. A hydrophobic film is formed on the valuable mineral particles to be removed by flotation, and a hydrophilic or wettable film is formed on the residue impurities by addition of various collecting, modifying and frothing agents. These additions allow adherence of the valuable mineral particles to air bubbles in a froth flotation process to provide a recoverable mineral laden froth on the surface of the ore pulp. Useful hydrophobic film forming collecting agents include heteropolar, i.e., containing both charged and uncharged groups, cationic materials, such as alkyl amines, and quaternary ammonium compounds, and anionic materials, such as xanthates, thionocarbamates, dithiophosphates, thiocarbanilide, xanthogen formates, fatty acids, and sulfonates. Various flocculants are separately discussed as providing high filter and improved cyclone separations for mill operations in the mining industry to improve the efficiency of solids-liquid separations. Useful flocculants include non-ionic, anionic and cationic high molecular weight, water soluble polymers.

What is needed is a pretreatment process to purify acidic solutions, by removing substantially all of the organic humic acids, which form sludge or emulsions at the phase interfaces during solvent extraction in metal recovery processes. The pretreatment process must be low in capital cost, and should result in low operating costs and operator attention.

SUMMARY OF THE INVENTION

A new and useful process has been discovered to inexpensively purify humic acid contaminated acidic solutions containing metal values, such as wet process phosphoric acid containing uranium values. This process, where organic humic acids are scrubbed, i.e., substantially removed from acidic solutions, can be used and will hereinafter be described as a pretreatment step in an extraction process for recovering uranium from phosphoric acid solutions. This process should be useful for both oxidative extraction-reductive strip and reductive extraction-oxidative strip methods of recovering uranium.

The pretreatment process involves using a gas in the wet process phosphoric acid solution stream, in association with high molecular weight anionic organic flocculant, and optionally, a small effective amount of liquid organic wetting agent. These materials are added in a volume ratio of wet process phosphoric acid having gas dispersed therethrough: flocculant:wetting agent, of 1,000 parts phosphoric acid having gas dispersed therethrough: 0.002 to 0.10 part flocculant:0.0 to 1.0 part wetting agent. The amount of gas dispersion ranges from about 1 cubic feet to about 100 cubic feet of gas per 1,000 gallons of wet process phosphoric acid solution. Preferably, the gas is fed into the acid as a separate stream. In the stream of humic acid containing phosphoric acid solution and gas, the flocculant and optional wetting agent attach to humic acid materials, and flocculate them into a hydrophobic mass, which is then fed into an unpressurized pretreatment vessel. In this vessel, the hydrophobic flocculated masses and the forming gas bubbles migrate toward each other to form low density agglomerations, resulting in an aqueous phosphoric acid phase containing valuable uranium values, and a flocculated humic acid froth phase containing minor amounts of uranium are, which separated. The humic froth or foam may be passed to a separator means to recover any organic wetting agent used. The aqueous, bottom, purified, phosphoric acid phase containing the uranium is then passed through a clarifier on its way to the extractor stage.

In the pretreatment vessel, small bubbles of gas are generated or released. These bubbles combine with the hydrophobic floccules containing the humic acids, each encapsulating portions of the other. The gas is preferably added to the phosphoric acid solution stream at a pressure of between about 20 psi. and about 50 psi. Useful flocculants include anionic, hydrolized polyacrylamides, and useful wetting agents include sulfonated oleic acids. The gas used can be $H_2$, $CO_2$, $SO_2$, $O_2$ or air, depending on the type of extraction operation employed.

BRIEF DESCRIPTION OF THE DRAWINGS

For a better description of the invention, reference may be made to the preferred embodiments exemplary of the invention, shown in the accompanying drawings, in which.

DESCRIPTION OF THE PREFERRED EMBODIMENTS

Figure 1:
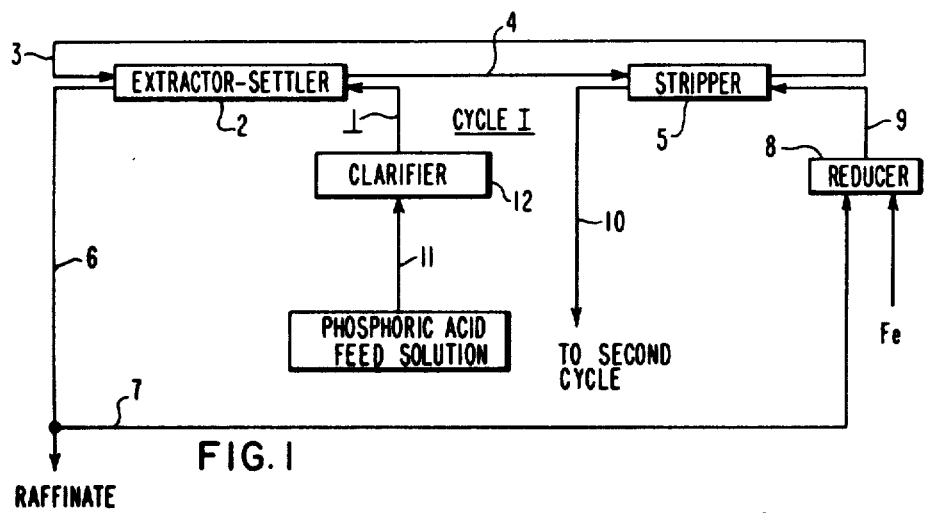
FIG. 1 is a flow diagram, illustrating one example of a prior art process for the stripping of uranium from phosphoric acid feed.

Referring to FIG. 1 of the drawings, one method of extracting metal from an acidic solution is shown, more specifically, the process involves one type of process for the extraction of uranium from 30% $H_3PO_4$. In Cycle I, clarified phosphoric feed acid from stream 1 enters mixer-settler means 2, which may contain 1 to 5 stages. This feed is typically a 35° C. to 50° C. aqueous 5 M to 6 M solution of phosphoric acid having a pH of up to about 1.5 and containing about 0.05 to about 0.05 gram/liter of uranium (generally as the uranous ion, $U^{+4}$) and a substantial amount of organic humic acids.

In the mixer-settler, the feed acid is contacted and mixed with a water-immiscible, organic extractant solvent composition from stream 3. The extractant solvent composition comprises a reagent, generally dissolved in a hydrocarbon diluent such as kerosene. The reagent extracts the uranyl ions to form a uranium complex soluble in the organic solvent. The solvent composition from stream 3 can contain, for example, about 0.2 to 0.7 mole of a dialkyl phosphoric acid having from 4 to 12 carbon atoms in each chain, preferably di(2-ethylhexyl)-phosphoric acid (D2EHPA-reagent) per liter of diluent. Other solvents that could be used in different uranium extraction processes would include octyl phenyl phosphoric acid and octyl pyro phosphoric acid alone or in combination in kerosene, among others. The solvent can also contain from about 0.025 to about 0.25 mole of a reaction agent well known in the art, for example, a tri alkyl phosphine oxide, where the alkyl chains are linear, having from 4 to 10 carbon atoms, preferably tri octyl phosphine oxide (TOPO) per liter of solvent. These agents allow reduction of equipment size while increasing uranium extraction.

In the solvent extraction step in the mixer-settler 2, if the aqueous phosphoric feed acid solution contains organic humic acids such as suspended organic humic solids, an emulsion will form at the interface between the solvent phase and the aqueous acidic phase. This emulsion consists of small drops about 0.005 inch to 0.015 inch in diameter, believed to comprise about 2 wt.% to 7 wt.% humic acid solids which form a membrane, trapping acid solution.

This emulsion is a severe process nuisance which hinders the normal operation of the mixer-settlers and ties up expensive D2EHPA-TOPO-kerosine solvent. Generally, sludge formation in the mixer-settler means 2, which may be a bank of up to 5 units, is from about 2 to 20 cu. ft./1,000 gallons of phosphoric feed acid solution.

The solvent composition, containing complexed uranium and contaminates, passes through stream 4 to reductive stripper means 5, to strip uranium from the organic solvent. A portion of the raffinate from extractor 2 may be passed through streams 6 and 7 to reducer 8 and then on to the stripper 5 through line 9. The organic solvent leaving the stripper is then recycled through stream 3 to extractor 2. Finally, the strip solution containing uranium ions may be oxidized and fed through stream 10 into a Cycle II extraction process.

Figure 2:
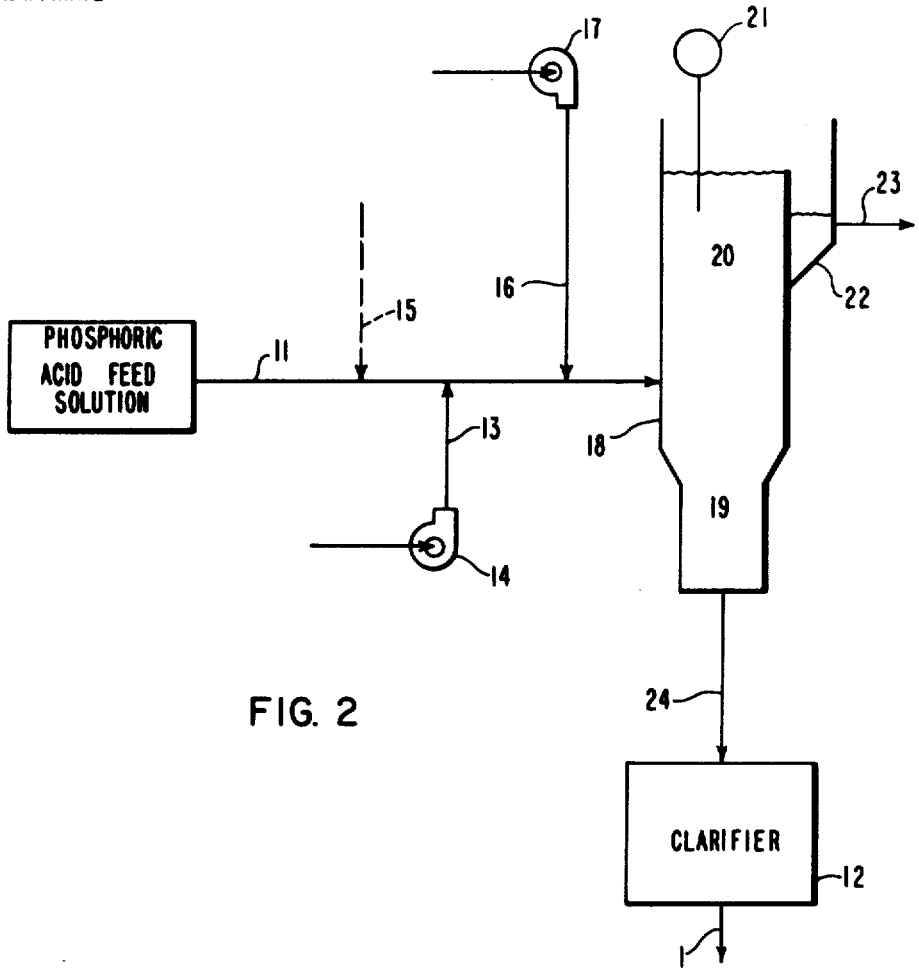
FIG. 2 is a flow diagram, illustrating the purification and sludge removal process of this invention.

As a method of purifying a metal value containing acid solution also containing organic humic acids, and as pretreatment, preferably before the acidic solution enters the clarifier 12, the feed acid can be reacted according to the flow diagram of FIG. 2. Uranium containing wet process phosphoric acid solution in stream 11, also containing organic humic acid contaminants and other sludge forming contaminants, is contacted by a gas preferably from stream 13, under a pressure provided by pump 14 effective to dissolve the gas in the acidic solution, usually between 20 psi. and 50 psi., preferably between 30 psi. and 40 psi. Pressures over 50 psi. are difficult to obtain in this process using conventional pump seals, and may shear the flocculant from the organic humic acids where they contact downstream. The gas can be preferably $H_2$ or $CO_2$ if a reductive extraction process is to be used, or preferably air or $O_2$ if an oxidation extraction process is to be used. While a separate stream of gas is preferred, it is possible to form gas bubbles in situ by reacting materials, for example metals such as aluminum, zinc or preferably iron, or carbonates, such as ammonium or sodium carbonate, which form $H_2$ or $CO_2$ with the phosphoric acid.

Small effective amounts of optional liquid organic wetting agent can be added through line 15, preferably before the gas addition stream, in order to wet the humic materials and allow ease of froth formation downstream. Useful liquid organic wetting agents include, among others well known in the art, sulfonated fatty acids, such as, preferably, sulfonated oleic acid, and hydrocarbons formed by the distillation of petroleum and having a boiling point of between about 110° C. and about 300° C., preferably kerosene.

High molecular weight anionic organic flocculant is added through stream 16 under pressure from pump 17, which must be at least 2 psi. greater than the pressure applied by pump 14. Of course, if gas is formed in-situ by chemical reaction, no pressure may be needed in the system. The flocculant disperses and contacts the humic acids contained in the gas permeated acid solution, and begins at this point to flocculate the humic acids and other solids into a hydrophobic mass. Pressure in the stream should be less than 50 psi., or the humic acids may be sheared from the flocculating agent. Useful anionic flocculants must have an average molecular weight of over about 6 million, preferably in the range of between about 6 million and about 15 million.

Useful high molecular weight anionic organic flocculants include hydrolyzed polyacrylamides, having a structural formula such as:

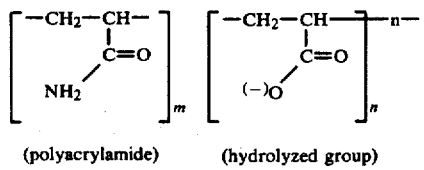

(polyacrylamide)     (hydrolyzed group)

where n equal 5 to 95, m equal 5 to 95, m plus n equal 100, and the molecular weight is over about 6 million. The term "hydrolyzed" is herein defined as meaning at least 5% hydrolyzed. Cationic materials, such as polydiallyldimethyl ammonium, and non-ionic materials, such as polythylene oxide or non-hydrolyzed polyacrylamide, are not effective.

The amount of gas that can be used in stream 13 ranges from about 1 cubic foot to about 100 cubic feet per 1,000 gallons of wet process phosphoric acid solution. Over 100 cubic feet per 1,000 gallons of acid solution, may require a very large gas scrubbing system in the pretreatment vessel.

The useful volume ratio of wet process phosphoric acid having gas dispersed therethrough: flocculant:wetting agent is 1,000 parts phosphoric acid having gas dispersed therethrough: 0.002 to 0.10 part flocculant:0.0 to 1.0 part wetting agent. Over 1.0 part wetting agent/1,000 parts acid, would not be cost effective, would make sludge disposal difficult, and may affect rubber constructed equipment. Over 0.10 part flocculant/1,000 parts acid, flocculation could be reversed, and small particles stabilized.

The pressurized stream of organic humic acid containing phosphoric acid solution, gas, flocculant and optional wetting agent is then fed into an unpressurized pretreatment vessel 18. In vessel 18 a bottom, purified, aqueous phosphoric acid phase, containing the valuable uranium values, as at point 19, and a flocculated humic acid froth phase, as at point 20 are formed. Liquid level control 21 is shown, which regulates the overflow of the flocculated humic acid foam phase into an overflow collector 22, from which the foam froth is removed via stream 23. The foam may then be passed to a separator means to recover organic wetting agent if any is used. The purified aqueous phosphoric acid phase is then passed via stream 24 from the bottom of the pretreatment reactor to the clarifier 12, and then through line 1 to the extractor stage.

In the pretreatment reactor 18, the dissolved gas which permeates the acid solution small bubbles of about 2 micron to about 50 micron average diameter, which are attracted by and drawn to the hydrophobic flocculated masses containing humic acid impurities, to form light density agglomerates containing encapsulated gas bubbles and humic acids. It is believed that the flocculated humic acids may provide sites for forming bubbles from the dissolved gas. The result is a froth of flocculated humic acid impurities as a top phase. This process is very effective to flocculate and remove a very substantial portion, i.e., about 80% to 95%, of the humic acids present in the phosphoric acid feed solution. The term "organic humic acid" is herein defined as the organic humic solids contained in the wet process phosphoric acid solution.

EXAMPLE

Fresh, commercial grade wet process phosphoric acid (30% $P_2O_5$), made from uncalcined Morrocan rock, containing large amounts of humic acid impurities, and about 0.1 to 0.2 gram/liter of uranium was mixed with sulfonated oleic acid wetting agent in a 500 ml. beaker with a magnetic stirrer at 50° C. A 30% active emulsion of anionic, hydrolyzed polyacrylamide, having an average molecular weight of about 10 million, further dissolved in water in a volume ratio polyacrylamide water of 3:1,000, was added to the beaker simultaneously with about 2 to 5 vol.% of aqueous, saturated sodium carbonate solution. The carbonate caused in-situ formation of small $CO_2$ bubbles. The volume ratio of gas permeated wet process phosphoric acid:hydrolyzed polyacrylamide flocculant:sulfonated oleic acid wetting agent was 1,000:0.03:0.5.

Flocculation was observed to be simultaneous with $CO_2$ evolution over a 2 minute period. The two phase system of impurity containing froth and uranium containing acid was allowed to rest for an additional 5 minutes. An analysis showed a top, solids rich froth, containing about 95% of the humic acid initially present in the wet process acid, and a fairly translucent green acid bottom phase acceptable for solvent extraction. Eighty power microscopic observation of fresh froth placed between two glass slides showed an agglomeration of bubbles and humic acids. This indicated a migration of flocculated masses to the gas bubbles and formation and compaction of froth. The humic acid-wetting agent-flocculant mass is hydrophobic, and attracts and provides a formation site for the gas bubbles, to the extent that they combine and form a matrix around each other, and are carried to the less dense top phase.

We claim:

1. A method of purifying a wet process phosphoric acid feed solution containing uranium values and also containing humic acid impurities, as a pretreatment in recovering uranium from wet process phosphoric acid, comprising the steps of:

(1) contacting humic acid containing phosphoric acid feed solution with a separate stream of a gas in a volume of from about 1 cubic foot to about 100 cubic feet of gas per 1,000 gallons of acidic solution at a pressure effective to dissolve and disperse the gas in the acidic solution, in association with addition of additives consisting of anionic, hydrolyzed polyacrylamide having a molecular weight of over about 6 million, as a flocculating agent, and liquid organic wetting agent for the humic impurities, in a volume ratio of acidic solution having gas dissolved and dispersed therethrough: flocculating agent:wetting agent, of 1,000:0.002 to 0.10:0.0 to 1.0, wherein humic acid impurities are flocculated, to form a pressurized mixture of phosphoric acid solution containing dissolved dispersed gas, and flocculated hydrophobic masses; and then (2) feeding the pressurized mixture into and dissolved in the acid forms gas bubbles which are released at or drawn to the flocculated masses, to provide a bottom, purified, aqueous acid phase containing uranium values and a top, gas containing, flocculated humic acid impurities froth phase; and then (3) removing the humic acid froth phase, to provide a purified acidic phase containing uranium values; and then (4) feeding the purified acidic phase into a clarifier means, and then into an extractor means of a uranium recovery process.

2. The method of claim 1, wherein the flocculating agent flocculates the humic acid to form hydrophobic masses, and the hydrophobic masses and gas migate toward each other to form low density agglomerations comprising the froth phase.

3. The method of claim 1, wherein the gas pressure in step (1) is from about 20 psi. to about 50 psi.

4. The method of claim 1, wherein the gas is selected from the group consisting of $CO_2$, air and $O_2$.

5. The method of claim 1, wherein the gas is selected from the group consisting of $SO_2$, $H_2$ and $CO_2$.

6. The method of claim 1, wherein the flocculating agent is at least 5% hydrolyzed, and where the bubbles formed in the unpressurized vessel have an average diameter of from about 2 microns to about 50 microns.

7. The method of claim 1, wherein the wetting agent is selected from the group consisting of sulfonated fatty acids, and hydrocarbons formed by the distillation of petroleum and having a boiling point of between 110° C. and about 300° C.

8. The method of claim 3, wherein the purified acidic phase is fed into an extractor of a reductive stripping uranium recovery process.

* * * * *